US012396923B2

(12) United States Patent
Avila

(10) Patent No.: US 12,396,923 B2
(45) Date of Patent: Aug. 26, 2025

(54) PILL SORTING CONTAINER

(71) Applicant: United States Government as Represented by the Department of Veterans Affairs, Washington, DC (US)

(72) Inventor: Angel A. Avila, Santa Fe, NM (US)

(73) Assignee: United States Government as represented by the Department of Veterans Affairs, Washington, DC (US)

( * ) Notice: Subject to any disclaimer, the term of this patent is extended or adjusted under 35 U.S.C. 154(b) by 0 days.

(21) Appl. No.: 18/449,870

(22) Filed: Aug. 15, 2023

(65) Prior Publication Data

US 2024/0050311 A1 Feb. 15, 2024

Related U.S. Application Data

(60) Provisional application No. 63/398,059, filed on Aug. 15, 2022.

(51) Int. Cl.

*A61J 1/03* (2023.01)
*A61J 7/04* (2006.01)
*B65D 1/36* (2006.01)
*B65D 43/16* (2006.01)

(Continued)

(52) U.S. Cl.

CPC . *A61J 1/03* (2013.01); *A61J 7/04* (2013.01); *B65D 1/36* (2013.01); *B65D 43/16* (2013.01); *B65D 51/245* (2013.01); *B65D 83/0445* (2013.01); *A61J 2205/40* (2013.01); *B65D 2203/00* (2013.01); *B65D 2251/1058* (2013.01)

(58) Field of Classification Search

CPC .......... A61J 1/03; A61J 7/0069; A61J 7/0084; B65D 1/36; B65D 43/16; B65D 51/245; B65D 83/0445; B65D 75/327; B65D 2585/56
USPC .................. 206/538, 534, 528, 531; 220/507
See application file for complete search history.

(56) References Cited

U.S. PATENT DOCUMENTS 4,741,441 A * 5/1988 Keffeler .................... A61J 1/03 206/532
5,323,907 A * 6/1994 Kalvelage .............. B65D 75/54 206/534

(Continued)

FOREIGN PATENT DOCUMENTS

JP 2004115059 4/2004

*Primary Examiner* — Steven A. Reynolds
(74) *Attorney, Agent, or Firm* — Ballard Spahr LLP

(57) ABSTRACT

An apparatus for sorting pills has a body defining a plurality of receptacles. A slide plate is positioned on the body. The slide plate defines a first plurality of openings. The slide plate is slidable relative to the body about and between a first position and a second position. In the first position, the first plurality of openings are offset from respective receptacles of the plurality of receptacles so that the slide plate blocks the plurality of receptacles. In the second position, the first plurality of openings are aligned with respective receptacles of the plurality of receptacles so that pills can pass through the first plurality of openings and into the receptacles. A retaining plate retains the slide plate against the body. The retaining plate defines a slot, and the slide plate has a tab that extends through the slot and permits articulation of the slide plate.

18 Claims, 5 Drawing Sheets

(51) Int. Cl.
*B65D 51/24* (2006.01)
*B65D 83/04* (2006.01)

(56) References Cited

U.S. PATENT DOCUMENTS

| | | | | | |
|---|---|---|---|---|---|
| 5,379,899 | A * | 1/1995 | Thurell | A61J 1/03 | 206/538 |
| 5,788,079 | A * | 8/1998 | Bouthiette | A61J 7/0069 | 206/534 |
| 6,382,420 | B1 * | 5/2002 | Bouthiette | B65D 75/327 | 206/534 |
| 7,451,876 | B2 * | 11/2008 | Bossi | A61J 1/035 | 206/488 |
| 9,839,583 | B2 * | 12/2017 | Kim | A61J 7/0069 | |
| 9,962,318 | B1 * | 5/2018 | Miceli | A61J 7/0084 | |
| 9,980,881 | B1 * | 5/2018 | Miceli | A61J 7/0436 | |
| 10,369,076 | B2 * | 8/2019 | Milante | A61J 1/035 | |
| 10,391,027 | B1 * | 8/2019 | Pande | A61J 1/03 | |
| 2009/0206100 | A1 | 8/2009 | Mazur | | |
| 2009/0283438 | A1 * | 11/2009 | Bourque | A61J 1/03 | 156/253 |
| 2010/0236960 | A1 * | 9/2010 | Niven | A61J 7/0069 | 206/459.1 |
| 2013/0030566 | A1 * | 1/2013 | Shavelsky | A61J 7/04 | 221/154 |
| 2013/0056385 | A1 | 3/2013 | Thompson | | |
| 2014/0251861 | A1 * | 9/2014 | Priebe | A61J 7/04 | 206/534 |
| 2016/0089304 | A1 * | 3/2016 | Niven | A61J 7/0409 | 206/534 |
| 2016/0158106 | A1 * | 6/2016 | Flynn | B65D 25/02 | 206/534 |
| 2016/0331642 | A1 * | 11/2016 | Miceli | G16H 20/13 | |
| 2016/0367435 | A1 * | 12/2016 | Ahmadi | A61J 7/0481 | |
| 2017/0273870 | A1 * | 9/2017 | Radomil | B65D 21/023 | |
| 2018/0318172 | A1 * | 11/2018 | Häfner | B65B 3/003 | |
| 2021/0128405 | A1 * | 5/2021 | Lee | A61J 7/0084 | |
| 2022/0273516 | A1 * | 9/2022 | Kwon | A61J 7/0481 | |
| 2022/0287915 | A1 * | 9/2022 | LeBrun | G16H 20/10 | |
| 2023/0032056 | A1 * | 2/2023 | Chang | B65D 5/48002 | |

* cited by examiner

PILL SORTING CONTAINER

CROSS-REFERENCE TO RELATED APPLICATION

This application claims priority to and the benefit of the filing date of U.S. Provisional Patent Application No. 63/398,059, filed Aug. 15, 2022, the entirety of which is hereby incorporated by reference herein.

FIELD

This application relates to apparatuses for sorting and storing small articles, such as pills or other medications.

BACKGROUND

Conventional pill sorting containers have a plurality of compartments into which pills are dropped. Hygienically placing pills into these containers is difficult and time consuming. Inadvertently placing the wrong or too many pills into a receptacle requires difficult extraction of the inadvertently placed pills. Accordingly, a more effective way of sorting and storing pills is desirable.

SUMMARY

Disclosed herein, in one aspect, is an apparatus for sorting pills. The apparatus has a first axis, a second axis that is perpendicular to the first axis, and a third axis that is perpendicular to the first and second axes. The apparatus comprises a body having a first side and a second side that are spaced along the first axis. The body defines a plurality of receptacles that extend between the first side and the second side of the body. The plurality of receptacles are arranged into at least one row. Each receptacle comprises a peripheral sidewall that extends circumferentially around an interior volume. A slide plate is positioned on the first side of the body. The slide plate defines a first plurality of openings, wherein the slide plate is slidable relative to the body about and between: a first position, in which the first plurality of openings are offset from respective receptacles of the plurality of receptacles along the second axis so that the slide plate blocks the plurality of receptacles; and a second position, in which the first plurality of openings are aligned with respective receptacles of the plurality of receptacles along the second axis so that pills can pass through the first plurality of openings and into the receptacles. A retaining plate is releasably coupled to the first side of the body. The retaining plate retains the slide plate against the body. The retaining plate defines at least one slot that is elongated along the second axis. The slide plate comprises a respective tab that extends through each slot of the at least one slot of the retaining plate. The respective tab permits articulation of the slide plate about and between the first and second positions.

In another aspect, a lid for an apparatus for sorting pills is disclosed, the apparatus having a body. The lid includes a lid latch that is configured to releasably engage a body of a pill container apparatus. A protrusion extends along a first axis proximate to the lid latch. The protrusion defines an opposed surface to the lid latch that permits squeezing of the lid latch and the opposed surface.

Additional advantages of the disclosed system and method will be set forth in part in the description which follows, and in part will be understood from the description, or may be learned by practice of the disclosed system and method. The advantages of the disclosed system and method will be realized and attained by means of the elements and combinations particularly pointed out in the appended claims. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the disclosed apparatus, system, and method and together with the description, serve to explain the principles of the disclosed apparatus, system, and method.

DETAILED DESCRIPTION

Figure 1:
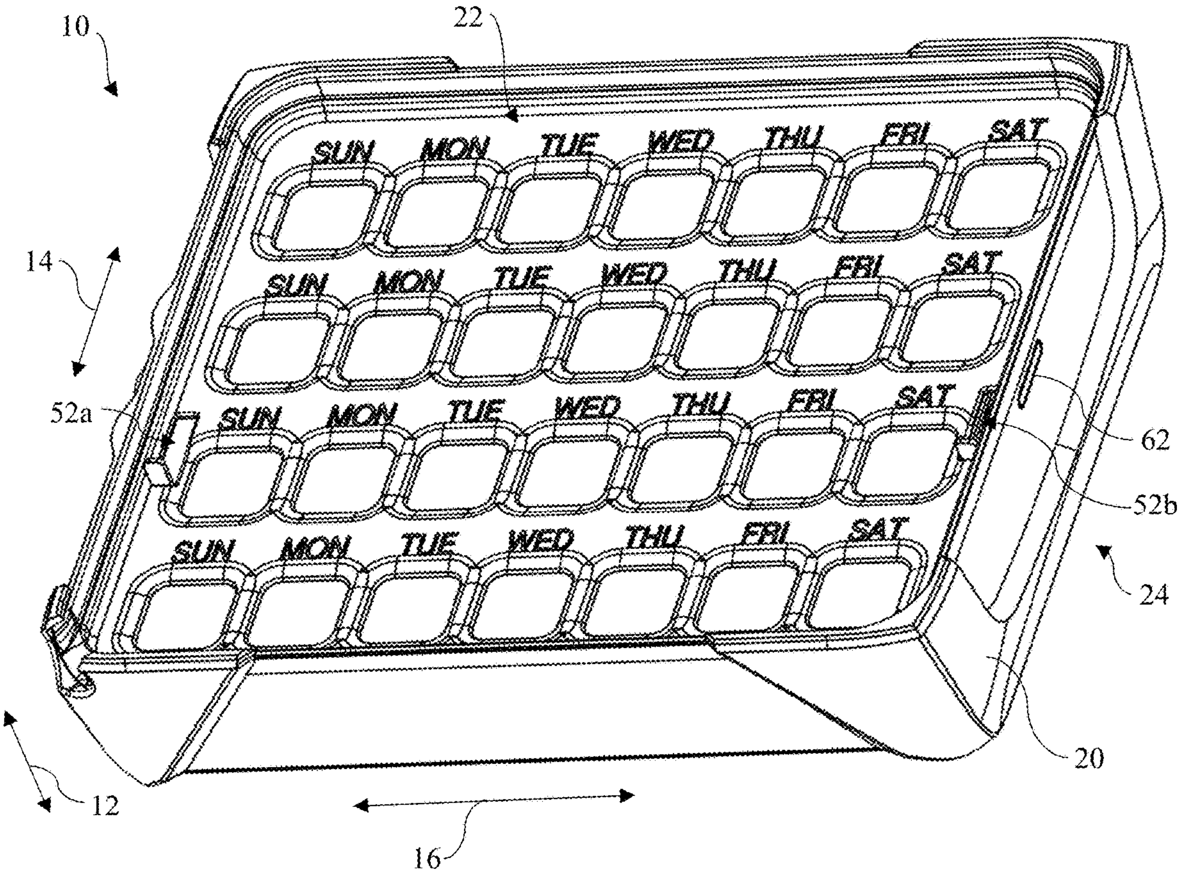
FIG. 1 is a perspective view of an apparatus for sorting pills as disclosed herein.

The disclosed system and method may be understood more readily by reference to the following detailed description of particular embodiments and the examples included therein and to the Figures and their previous and following description.

It is to be understood that the terminology used herein is for the purpose of describing particular embodiments only and is not intended to limit the scope of the present invention which will be limited only by the appended claims.

It must be noted that as used herein and in the appended claims, the singular forms "a," "an," and "the" can include plural references unless the context clearly dictates otherwise. Thus, for example, reference to "a lid" includes both disclosure of one lid and disclosure of more than one lid, and so forth. Accordingly, except where the context clearly indicates otherwise, when a singular form of an element is disclosed, it is understood that the application provides support for embodiments in which only one of such elements is provided, as well as support for embodiments in which a plurality of such elements is provided.

As used herein "or" should be understood to be an inclusive or unless context dictates otherwise. For example, when separating items in a list, "or" should be interpreted as being inclusive, i.e., the inclusion of at least one, but also including more than one, of a number or list of elements, and, optionally, additional unlisted items. Thus, except where the context clearly dictates otherwise, the term "or" should be understood to provide support for embodiments that include only a single element of a list of elements, as well as for embodiments that include more than one of the elements from the list of elements.

"Optional" or "optionally" means that the subsequently described event, circumstance, or material may or may not occur or be present, and that the description includes instances where the event, circumstance, or material occurs or is present and instances where it does not occur or is not present.

Ranges may be expressed herein as from "about" one particular value, and/or to "about" another particular value. When such a range is expressed, also specifically contemplated and considered disclosed is the range from the one particular value and/or to the other particular value unless the context specifically indicates otherwise. Similarly, when values are expressed as approximations, by use of the antecedent "about," it will be understood that the particular value forms another, specifically contemplated embodiment that should be considered disclosed unless the context specifically indicates otherwise. It will be further understood that the endpoints of each of the ranges are significant both in relation to the other endpoint, and independently of the other endpoint unless the context specifically indicates otherwise. Finally, it should be understood that all of the individual values and sub-ranges of values contained within an explicitly disclosed range are also specifically contemplated and should be considered disclosed unless the context specifically indicates otherwise. The foregoing applies regardless of whether in particular cases some or all of these embodiments are explicitly disclosed.

Optionally, in some aspects, when values or characteristics are approximated by use of the antecedents "about," "substantially," or "generally," it is contemplated that values within up to 15%, up to 10%, up to 5%, or up to 1% (above or below) of the particularly stated value or characteristic can be included within the scope of those aspects.

Unless defined otherwise, all technical and scientific terms used herein have the same meanings as commonly understood by one of skill in the art to which the disclosed apparatus, system, and method belong. Although any apparatus, systems, and methods and materials similar or equivalent to those described herein can be used in the practice or testing of the present apparatus, system, and method, the particularly useful methods, devices, systems, and materials are as described.

Throughout the description and claims of this specification, the word "comprise" and variations of the word, such as "comprising" and "comprises," means "including but not limited to," and is not intended to exclude, for example, other additives, components, integers or steps. In particular, in methods stated as comprising one or more steps or operations it is specifically contemplated that each step comprises what is listed (unless that step includes a limiting term such as "consisting of"), meaning that each step is not intended to exclude, for example, other additives, components, integers or steps that are not listed in the step.

Figure 2:
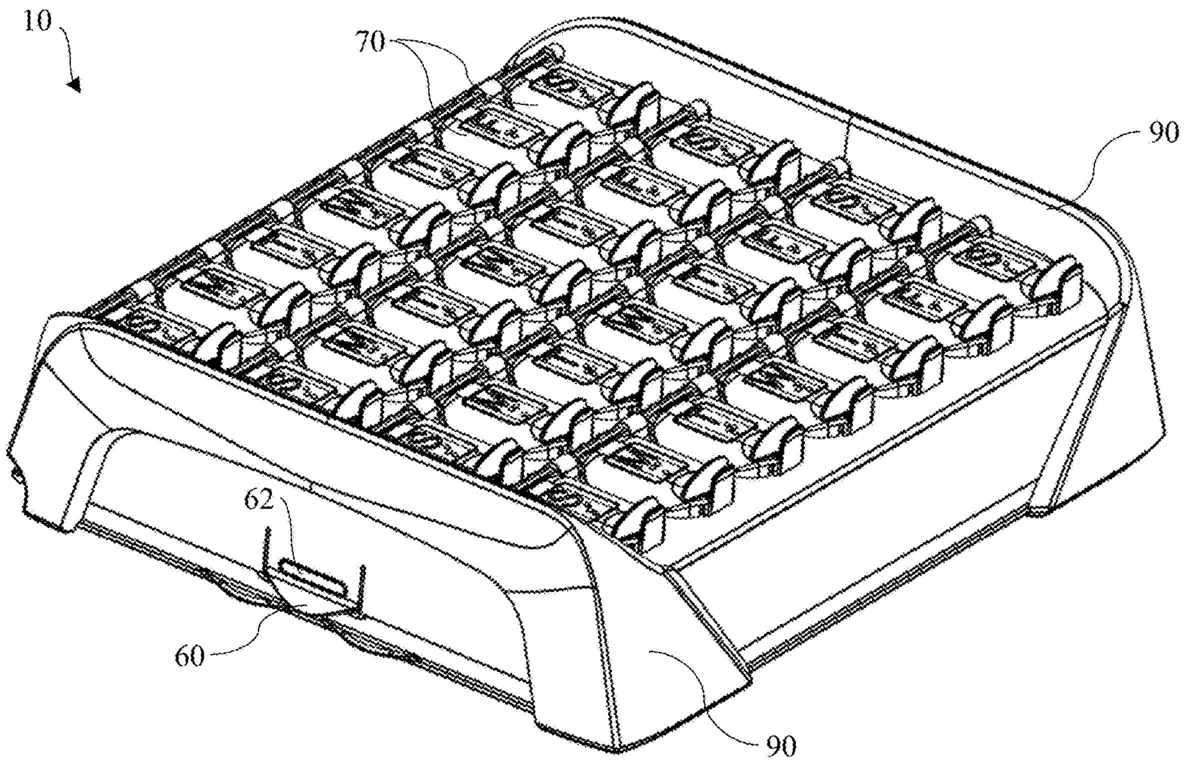
FIG. 2 is another perspective view of the apparatus of FIG. 1.
Figure 3:
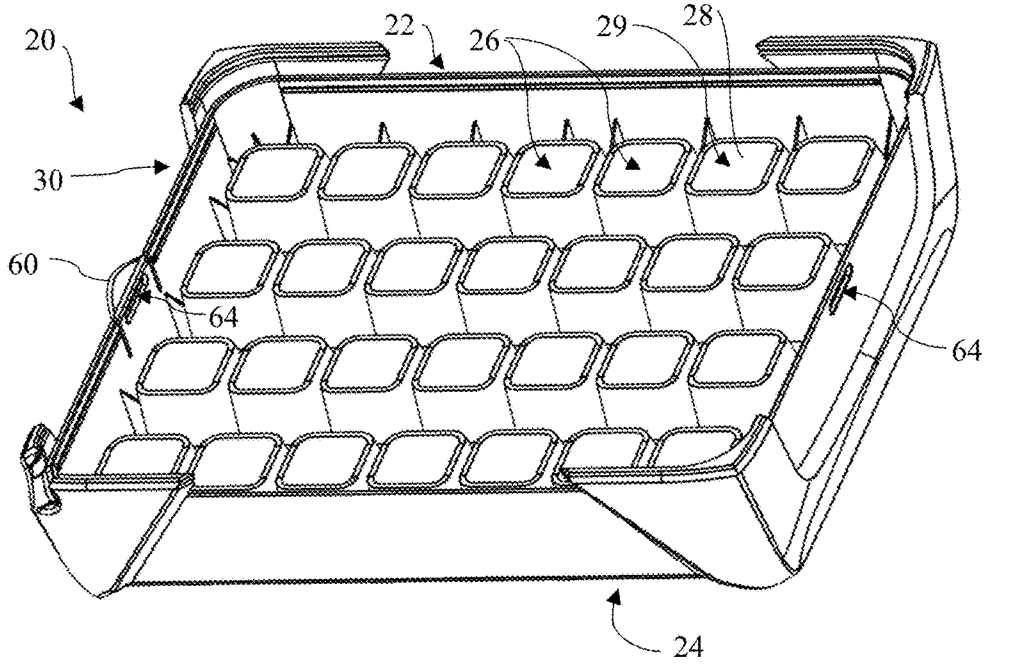
FIG. 3 is a perspective view of the body of the apparatus of FIG. 1.

Disclosed herein, and with reference to FIGS. 1-3, is an apparatus 10 for sorting pills. As used herein, a "pill" can be understood to be a medicinal or dietary preparation that can be consumed orally. In some aspects, "pills" can include capsules, tablets, and the like. In some aspects, pills can be swallowed whole. In other aspects, pills can be chewable.

The apparatus 10 can have a first axis 12 (e.g., a vertical axis along a height of the apparatus), a second axis 14 (e.g., an axis along the width of the apparatus) that is perpendicular to the first axis 12, and a third axis 16 (e.g., an axis along the length of the apparatus) that is perpendicular to the first and second axes. The apparatus 10 can comprise a body 20 having a first side 22 and a second side 24 that are spaced along the first axis 12. The body 20 can define a plurality of receptacles 26 that extend between the first side 22 and the second side 24 of the body 20. The plurality of receptacles 26 can be arranged into at least one row 30 (optionally, distributed among a plurality of rows 30). As shown in FIG. 3, each receptacle 26 can comprise a peripheral sidewall 28 that extends circumferentially around an interior volume 29.

Figure 4:
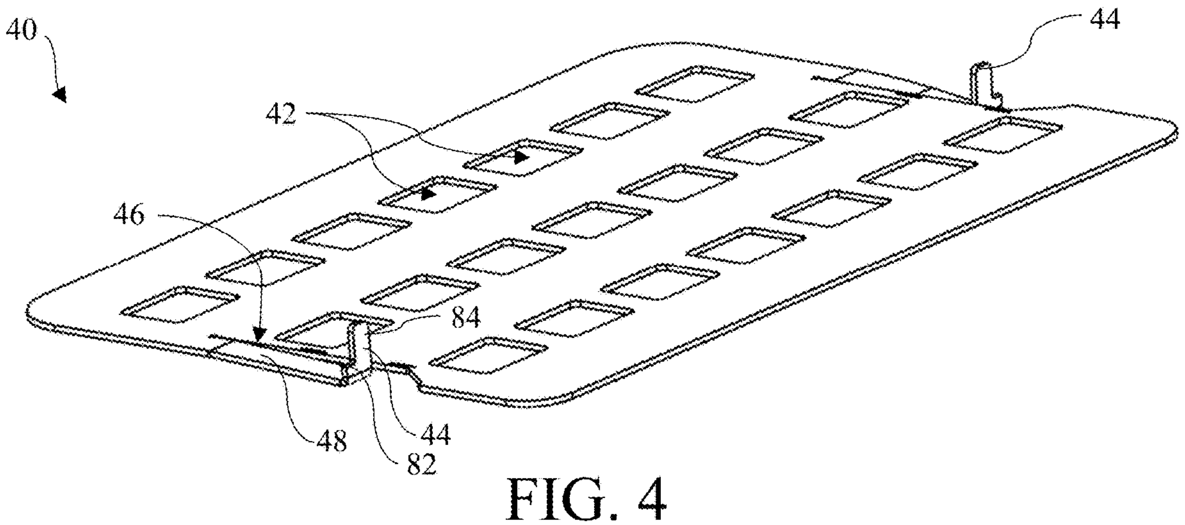
FIG. 4 is a perspective view of the slide plate of the apparatus of FIG. 1.

Referring to FIGS. 1 and 4, a slide plate 40 can be positioned on the first side 22 of the body 20. The slide plate 40 can define a first plurality of openings 42. The slide plate 40 can be slidable relative to the body 20 about and between a first position and a second position. In the first position (FIG. 1), the first plurality of openings 42 can be offset from respective receptacles 26 of the plurality of receptacles along the second axis 14 so that the slide plate 40 blocks the plurality of receptacles. In the second position, the first plurality of openings 42 can be aligned with respective receptacles 26 of the plurality of receptacles along the second axis 14 so that pills can pass through the first plurality of openings and into the receptacles.

Figure 5:
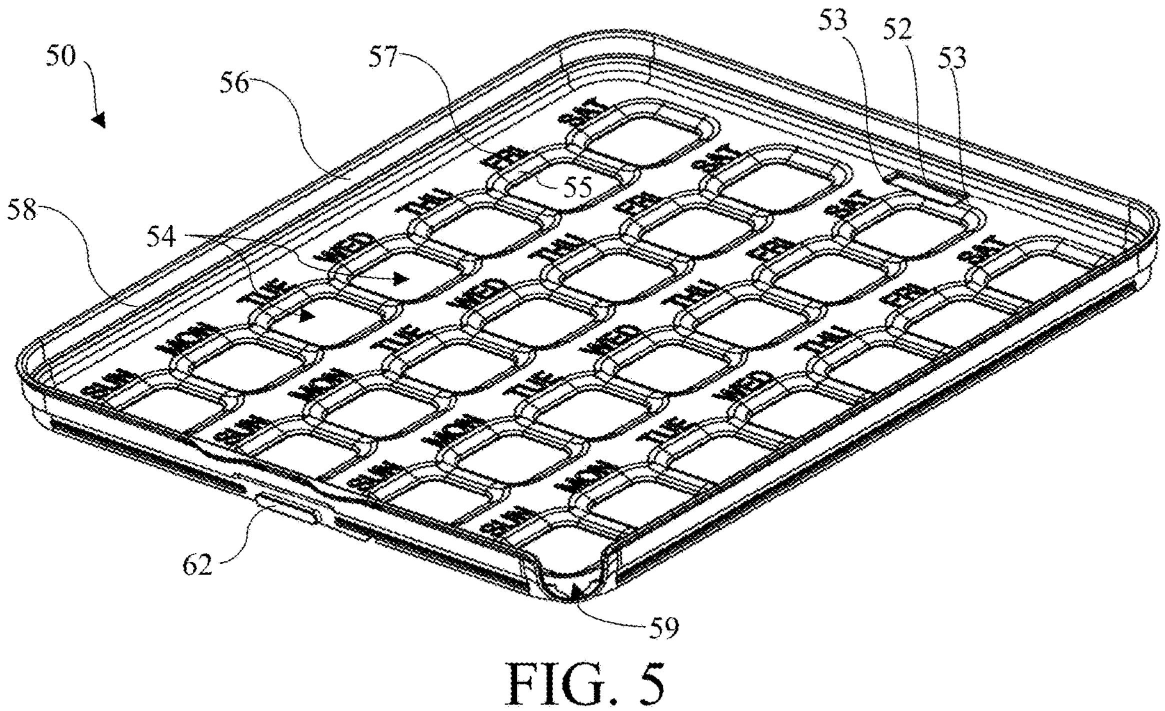
FIG. 5 is a perspective view of the retaining plate of the apparatus of FIG. 1

Referring to FIGS. 1 and 5, a retaining plate 50 can be releasably coupled to the first side 22 of the body 20. The retaining plate 50 can retain the slide plate against the body 20. The retaining plate 50 can define at least one slot 52 that is elongated along the second axis 14. For example, in some aspects, and as shown in FIG. 1, the retaining plate 50 can have a first slot **52*a* and a second slot 52*b* that are spaced along the third axis 16. In use, it is contemplated that decoupling of the retaining plate 50 from the body 20 can release the slide plate 40** from the body.

Referring also to FIG. 4, the slide plate 40 can comprise at least one tab 44 (optionally, a plurality of tabs), and each tab of the at least one tab can extend through a respective slot 52 of the retaining plate 50. The tabs 44 can permit articulation (e.g., sliding) of the slide plate 40 about and between the first and second positions.

Figure 7:
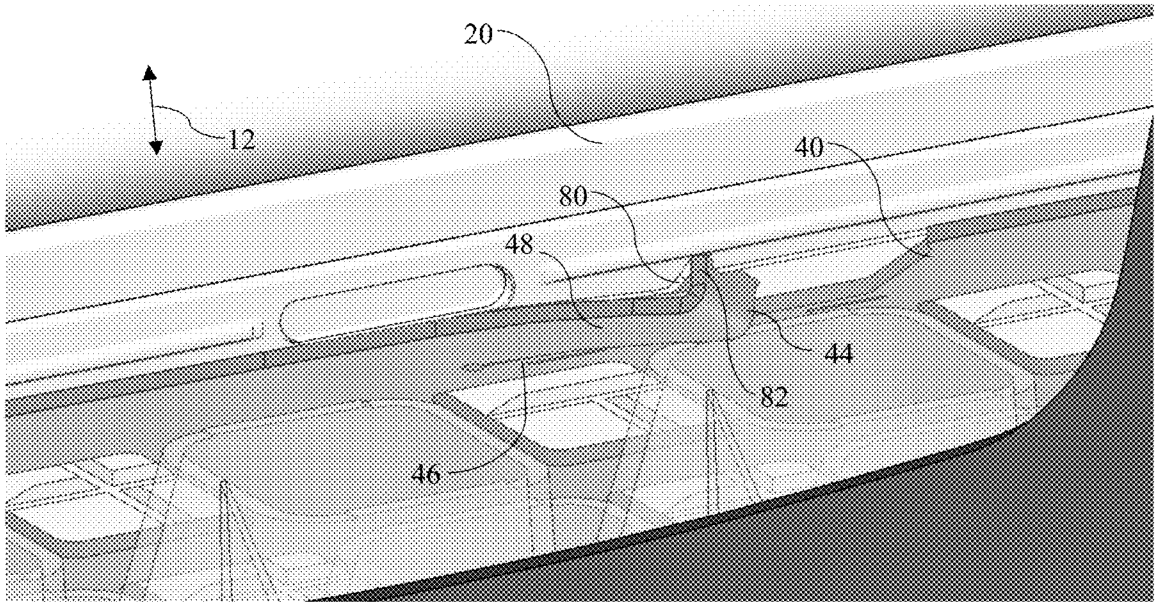
FIG. 7 is a partially transparent perspective view of a locking feature of the lid of FIG. 1 in a locking configuration.
Figure 8:
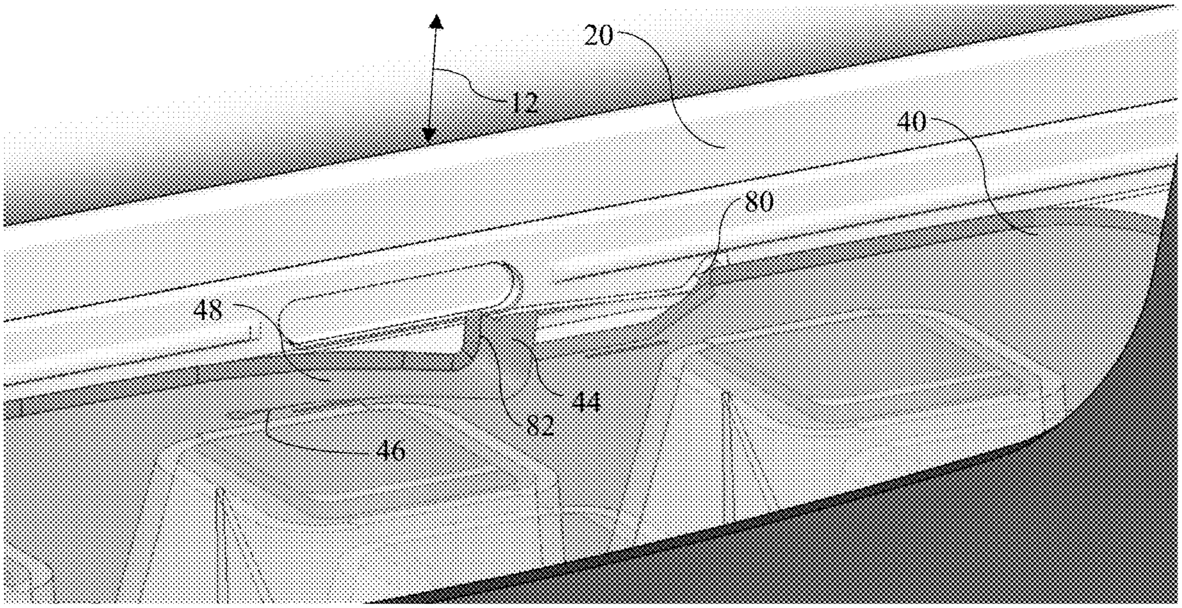
FIG. 8 is partially transparent perspective view of the locking feature of FIG. 7 in a released configuration.

Referring to FIGS. 1, 4, 7, and 8, in some aspects, the slide plate 40 can be configured to lock in the first position to retain pills within the receptacles 26. For example, the body 20 can define at least one catch 80, wherein each catch of the at least one catch is configured to contact a portion 82 of a respective tab 44 when said tab is in a first configuration (FIG. 7). The tab 44 can be biased downwardly (when the first side 22 of the body is positioned above the second side 24) along the first axis 12 to move the portion 82 of the tab 44 away from the catch 80 until the portion 82 of the tab 44 can move laterally along the second axis 14 (see FIG. 8). In some aspects, the portion 82 that is configured to contact the catch 80 can extend laterally from a gripping portion 84 of the tab along the third axis 16. In some optional aspects, the slide plate 40 can comprise a lever arm 48 that flexes to permit movement of the tab 44 along the first axis 12. For example, the slide plate 40 can define a cut 46 between the lever arm 48 and the rest of the slide plate in order to form the lever arm 48. It is contemplated that by having two (or more) tabs 44, each with a locking feature, inadvertent release and movement of the slide plate from the first position can be prevented.

In exemplary aspects, the slot(s) 52 can serve to limit the movement of the slide plate 40. For example, each slot 52 can comprise opposed ends 53. Contact between the respective tab 44 and each of the opposed ends 53 of the slot 52 can inhibit movement of the slide plate outside of travel about and between the first and second positions.

Each row 30 can have a plurality of receptacles 26 (e.g., seven receptacles). In this way, the apparatus 10 can be configured to sort a week's worth of pills. In some aspects, the receptacles 26 can be arranged in a plurality of rows 30

(e.g., four rows). In this way, the apparatus can be used to arrange pills for different times each day.

In some optional aspects, the retaining plate 50 can define a second plurality of openings 54. Each respective opening 54 of the second plurality of openings 54 can be aligned with a respective receptacle 26 of the plurality of receptacles along the second and third axes 14, 16 so that pills can pass through the respective opening 54 of the second plurality of openings and into the receptacle. When the slide plate 40 is in the first position, the first plurality of openings 42 can be offset from the second plurality of openings 54 along the second axis 14 so that the slide plate blocks the second plurality of openings. When the slide plate 40 is in the second position, the first plurality of openings 42 can be aligned with the second plurality of openings 54 along the second axis 14 so that pills can pass through the first and second plurality of openings and into the receptacles 26.

Referring to FIGS. 2 and 5, the body 20 can comprise a latch 60 that releasably couples the retaining plate 50 to the body. For example, as illustrated in FIGS. 1, 2 and 4, the retaining plate 50 can comprise opposed protrusions 62 that are receivable into respective openings 64. One opening 64 can extend through the latch 60. The latch 60 of the body 20 can permit movement of one opening 64 away from the other to permit removal of the protrusions 62 from the openings. In exemplary aspects, the latch 60 can be integral to the body 20. For example, the latch 60 can be flexible to permit movement thereof relative to the rest of the body 20.

Referring to FIGS. 1 and 5, the retaining plate 50 can have a perimeter 56 comprising at least one corner 57. The retaining plate 50 can comprise an upwardly extending lip 58 that extends peripherally around the perimeter of the retaining plate. The retaining plate 50 can further comprise a pour spout 59 at a corner of the at least one corner. The pour spout 59 can be defined by, for example, an opening in the lip 58.

Figure 6:
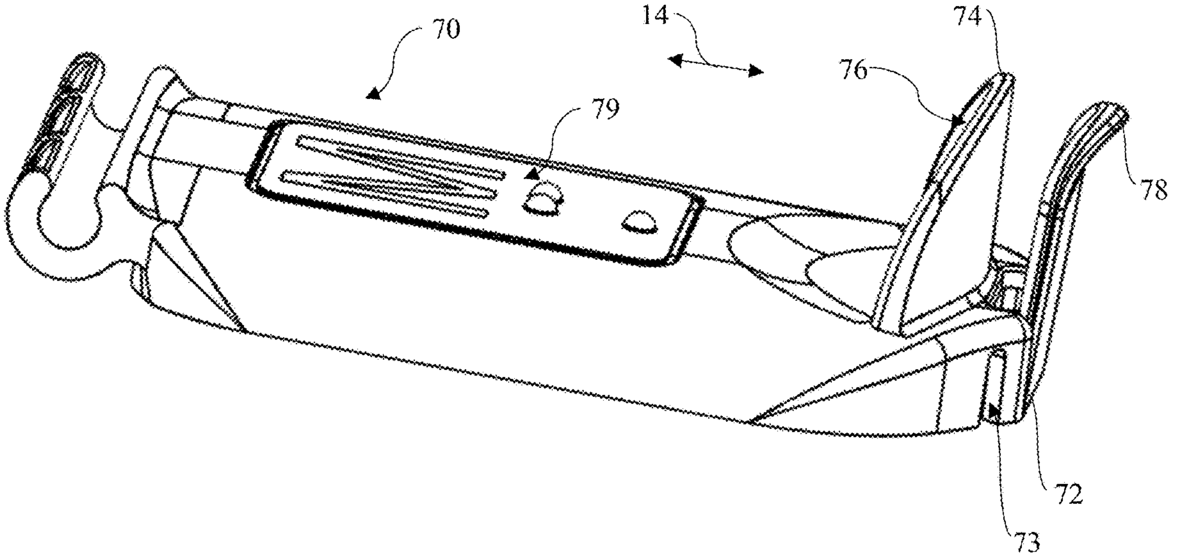
FIG. 6 is a perspective view of an exemplary lid of the apparatus of FIG. 1.

Referring to FIG. 6, the apparatus 10 can comprise a plurality of lids 70 that are pivotably coupled to the second side of the body 20. Each lid 70 of the plurality of lids can be configured to cover a respective receptacle of the plurality of receptacles at the second side of the body. Each lid 70 of the plurality of lids comprises a lid latch 72 that is configured to releasably engage the body. Optionally, each lid 50 can further comprise a protrusion 74 that extends along the first axis 12 proximate to the lid latch 72, wherein the protrusion defines an opposed surface 76 to the lid latch 72 that permits squeezing of the lid latch and the opposed surface. In this way, a user can pinch the lid latch and protrusion 74 to disengage the lid latch 72 from the body 20. This can assist those with limited finger strength or dexterity. Optionally, as shown in FIG. 6, the opposed surface 76 of the protrusion 74 can be concave in a direction away from the lid latch 72 (such that the concavity faces away from the lid latch) to enhance gripping.

In further aspects, the lid 70 can be disengaged by pushing against an outer surface of the lid latch 72, opposite the protrusion 74 to flick the lid open (e.g., by pushing the latch without pinching the latch and the protrusion 74. In some aspects, the lid latch 72 can comprise an outward hook 78 that extends away from the protrusion 74 to enhance grip between a finger of a user and the lid latch 74. Generally, as can be understood, users of the disclosed apparatus may have limited strength and dexterity in their fingers. The disclosed lid can advantageously be actuated by those with limited strength and dexterity in their fingers.

The protrusion 74 and lid latch 72 can be spaced away from each other along the second axis 14 by a predetermined distance that is sufficient to disengage the latch from the body but limited to inhibit plastic deformation of the lid latch 72. The lid 70 can comprise notches 73 that permit pivoting of the lid latch 72 relative to the rest of the lid 70. The lid latch 72 can connect to the rest of the lid 70 by a coupling portion of the lid having a thickness that is selected to permit release of the lid latch upon application of a predetermined force. The lid latch 72 can have a tapered ramp surface to cause the lid latch to bias outwardly to engage the body upon application of a vertical force against a top of the lid when closing the lid.

Optionally, each lid 70 of the plurality of lids can comprise a label 79. The label 79 can comprise, for example, an indication of the day of the week. The indication can include, for example the first letter of the day of the week, an abbreviation of the day of the week, or the like. In further aspects, the label 79 of each lid 70 of the plurality of lids can comprise Braille. In some aspects, the label 79 can comprise raised lettering. In this way, those having vision impairment can determine by touch the label (e.g., the day of the week indicated) without learning Braille.

In some aspects, the retaining plate 50 can define a rounded or tapered edge 55 that surrounds each opening of the second plurality of openings 54. The rounded or tapered edge 55 can permit pills to easily be moved from the second plurality of openings 54.

In some aspects, the retaining plate 50 can comprise a label 57 at each opening of the second plurality of openings. The label 57 can be, for example, an indication of the day of the week. The label 57 can be, for example, printed or molded into the retaining plate 50.

In various optional aspects, one or more (optionally, all) of the body 20, the retaining plate 50, and the slide plate 40 can comprise molded polymer.

In some aspects, the apparatus 10 can comprise one or more resilient bumpers. For example, the bumper(s) can comprise rubber or other resilient polymer. The resilient bumper can protect the apparatus 10 in case of the apparatus being dropped. Accordingly, the resilient bumper can be positioned over one or more edges. The resilient bumper can further be configured to provide a high friction coefficient against an opposed surface (e.g., a table) to prevent the apparatus 10 from sliding and to enhance a grip of a user. In some aspects, the raised portions 90 can form the bumpers. The bumpers can further extend over and protect the retaining plate 50 when the apparatus 10 is assembled.

The receptacles of the apparatus can be associated with consumption of pills at particular intervals. For example, the apparatus can be configured for arranging a week's pills to be taken at four different intervals during the day.

Using the apparatus 10, pills can be arranged into proper receptacles associated with consumption at scheduled intervals. With the slide plate 40 in the first position, an individual (e.g., a caretaker or a pill user) can deposit a plurality of pills onto the apparatus, with the first side 22 of the body 20 facing upwardly so that the pills are received against the slide plate 40 and the retaining plate 50. The user can slide the pills across the apparatus and into desired openings 54 of the second plurality of openings. Remaining pills can be directed out of the spout 59. Once the pills are above the desired receptacles, the slide plate 40 can be moved from the first position to the second position by sliding the tabs 44 within the slots 52 to drop the pills into the respective containers. By sliding the tabs 44 within the slots 52 in an opposite direction, the slide plate 40 can be returned to the first position, thereby enclosing the pills in the respective containers. The process of distributing and depositing pills into the desired receptacles and can be repeated as necessary for additional pills. The apparatus 10 can be flipped, and the pills can be accessed via the lids 70 for consumption.

The apparatus 10 can be dismantled for cleaning or sanitization. Thus, in some exemplary aspects, the apparatus 10 can comprise materials that permit sanitization. The retaining plate 50 can be decoupled from the body 20, thereby releasing the slide plate 40. For example, the latch 60 of the body 20 can be articulated to decouple the retaining plate 50 from the body 20. In exemplary aspects, the lids 70 can releasably clip to the body 20. Thus, in some aspects, the lids 70 can also be removed for cleaning. The apparatus 10 can be reassembled in a reverse fashion. For example, the retaining plate 50 can be coupled from the body 20 with the slide plate 40 positioned between the body and the retaining plate.

In some aspects, the lids 70 can be replaced, rearranged, and otherwise customized for the needs of the user. For example, the lids can be arranged so that the labels on the lids correspond to a day of the month. In other aspects, the lids can be arranged so that the lids correspond to particular times of day to administer medication. The lids can be provided in one or more colors. For example, color of the lids can denote time (e.g. morning, noon, night, bedtime) for taking the pills.

The apparatus, and portions of the apparatus, disclosed herein can serve ornamental purposes, functional purposes, or both.

Those skilled in the art will recognize, or be able to ascertain using no more than routine experimentation, many equivalents to the specific embodiments of the method and compositions described herein. Such equivalents are intended to be encompassed by the following claims.

What is claimed is:

1. An apparatus for sorting pills, the apparatus having a first axis, a second axis that is perpendicular to the first axis, and a third axis that is perpendicular to the first and second axes, the apparatus comprising:

a body having a first side and a second side that are spaced along the first axis, wherein the body defines a plurality of receptacles that extend between the first side and the second side of the body, wherein the plurality of receptacles are arranged into at least one row, wherein each receptacle comprises a peripheral sidewall that extends circumferentially around an interior volume;

a slide plate positioned on the first side of the body, wherein the slide plate defines a first plurality of openings, wherein the slide plate is slidable relative to the body about and between:

a first position, in which the first plurality of openings are offset from respective receptacles of the plurality of receptacles along the second axis so that the slide plate blocks the plurality of receptacles; and a second position, in which the first plurality of openings are aligned with respective receptacles of the plurality of receptacles along the second axis so that pills can pass through the first plurality of openings and into the receptacles; and a retaining plate that is releasably coupled to the first side of the body, wherein the retaining plate retains the slide plate against the body, wherein the retaining plate defines at least one slot that is elongated along the second axis, wherein the slide plate comprises at least one tab, wherein a respective tab of the at least one tab extends through each slot of the at least one slot of the retaining plate, and wherein the respective tab permits articulation of the slide plate about and between the first position and the second position.

2. The apparatus of claim 1, wherein the at least one row comprises a plurality of rows.

3. The apparatus of claim 1, wherein the plurality of receptacles comprises seven receptacles per row of the at least one row.

4. The apparatus of claim 1, wherein the retaining plate defines a second plurality of openings, wherein each respective opening of the second plurality of openings is aligned with a respective receptacle of the plurality of receptacles along the second and third axes so that pills can pass through the respective opening of the second plurality of openings and into the receptacle, wherein:

when the slide plate is in the first position, the first plurality of openings are offset from the second plurality of openings along the second axis so that the slide plate blocks the second plurality of openings; and when the slide plate is in the second position, the first plurality of openings are aligned with the second plurality of openings along the second axis so that pills can pass through the first and second plurality of openings and into the receptacles.

5. The apparatus of claim 1, wherein the body comprises a latch that releasably couples the retaining plate to the body.

6. The apparatus of claim 1, wherein decoupling of the retaining plate from the body releases the slide plate from the body.

7. The apparatus of claim 1, wherein the retaining plate has a perimeter comprising at least one corner, wherein the retaining plate comprises:

a pour spout at a corner of the at least one corner; and an upwardly extending lip that extends peripherally around the perimeter of the retaining plate.

8. The apparatus of claim 1, further comprising a plurality of lids that are pivotably coupled to the second side of the body, wherein each lid of the plurality of lids is configured to cover a respective receptacle of the plurality of receptacles at the second side of the body.

9. The apparatus of claim 8, wherein each lid of the plurality of lids comprises a lid latch that is configured to releasably engage the body.

10. The apparatus of claim 9, wherein each lid further comprises a protrusion that extends along the first axis proximate to the lid latch, wherein the protrusion defines an opposed surface to the lid latch that permits squeezing of the lid latch and the opposed surface.

11. The apparatus of claim 10, wherein the opposed surface of the protrusion is concave in a direction away from the lid latch.

12. The apparatus of claim 1, wherein the at least one slot comprises opposed ends, wherein contact between the respective tab and the opposed ends of the at least one slot inhibits movement of the slide plate outside of travel about and between the first and second positions.

13. The apparatus of claim 1, wherein the at least one slot comprises a first slot and a second slot that are spaced along the third axis.

14. The apparatus of claim 8, wherein each lid of the plurality of lids comprises a label.

15. The apparatus of claim 14, wherein the label of each lid of the plurality of lids comprises Braille or at least one raised letter.

16. The apparatus of claim 1, wherein the retaining plate defines a rounded edge that surrounds each opening of the second plurality of openings.

17. The apparatus of claim 1, wherein the retaining plate comprises a label at each opening of the second plurality of openings.

18. The apparatus of claim 1, wherein each of the body, the retaining plate, and the slide plate comprise molded polymer.

* * * * *